US012746983B2

(12) United States Patent
Fox-Rabinovitz et al.

(10) Patent No.: US 12,746,983 B2
(45) Date of Patent: Sep. 29, 2026

(54) AUTONOMOUS VEHICLE WITH AN IMPROVED CAB DESIGN

(71) Applicant: Torc Robotics, Inc., Blacksburg, VA (US)

(72) Inventors: Joseph R. Fox-Rabinovitz, Blacksburg, VA (US); Christopher Harrison, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 287 days.

(21) Appl. No.: 18/543,723

(22) Filed: Dec. 18, 2023

(65) Prior Publication Data

US 2025/0196942 A1 Jun. 19, 2025

(51) Int. Cl.

| | |
|---|---|
| ***B62D 33/06*** | (2006.01) |
| ***B60Q 1/04*** | (2006.01) |
| ***B60Q 1/50*** | (2006.01) |
| ***B60R 1/06*** | (2006.01) |
| ***B62D 35/00*** | (2006.01) |
| ***B62D 65/02*** | (2006.01) |

(52) U.S. Cl.

CPC ............... *B62D 33/06* (2013.01); *B60Q 1/04* (2013.01); *B60Q 1/507* (2022.05); *B60R 1/0605* (2013.01); *B62D 35/001* (2013.01); *B62D 65/02* (2013.01)

(58) Field of Classification Search

CPC ..... B62D 33/06; B62D 35/001; B62D 35/005

USPC ....................................................... 296/182.1

See application file for complete search history.

(56) References Cited

U.S. PATENT DOCUMENTS

| | | | | | | |
|---|---|---|---|---|---|---|
| 4,095,835 | A | * | 6/1978 | Ensor | B62D 35/001 | 296/180.3 |
| 4,357,045 | A | * | 11/1982 | Kinford, Jr. | B62D 35/001 | 296/180.2 |
| 4,360,232 | A | * | 11/1982 | Elder | B62D 35/001 | 296/180.4 |
| 4,379,582 | A | * | 4/1983 | Miwa | B62D 35/007 | 296/180.5 |
| 4,458,937 | A | * | 7/1984 | Beckmann | B62D 35/001 | 296/180.3 |
| 4,629,241 | A | * | 12/1986 | Gruich | B62D 35/001 | 296/180.2 |

(Continued)

FOREIGN PATENT DOCUMENTS

| | | | | | |
|---|---|---|---|---|---|
| CN | 109421829 | A | * | 3/2019 | B62D 35/005 |
| DE | 202013004691 | U1 | * | 6/2013 | B62D 35/001 |

(Continued)

OTHER PUBLICATIONS https://trans.info/gruzovikus-an-unmanned-electric-self-cleaning-truck-from-russia-157214, 12 pages, Jul. 26, 2019.

(Continued)

*Primary Examiner* — Jason D Shanske

(74) *Attorney, Agent, or Firm* — Armstrong Teasdale LLP

(57) ABSTRACT

An autonomous vehicle is disclosed. The autonomous vehicle includes a plurality of wheels for supporting the autonomous vehicle and a cabin. The cabin is supported by a vehicle frame. The plurality of wheels is attached to connected to the vehicle frame. The cabin has a cabin bottom, a cabin top and a front portion that extends between the cabin bottom and the cabin top. The front portion includes an airfoil that has a substantially rigid front surface and an aerodynamic shape.

20 Claims, 8 Drawing Sheets

(56) References Cited

U.S. PATENT DOCUMENTS

| | | | | |
|---|---|---|---|---|
| 7,147,335 | B1 * | 12/2006 | Dickinson | B60R 1/006<br>359/857 |
| 7,992,666 | B2 * | 8/2011 | Otterstrom | B62D 35/001<br>180/165 |
| 9,278,720 | B2 * | 3/2016 | Rao | B62D 35/001 |
| 10,102,692 | B2 * | 10/2018 | Heil | B62D 35/005 |
| 10,189,513 | B2 * | 1/2019 | Heil | B62D 35/02 |
| 10,493,910 | B2 | 12/2019 | Boyle | |
| 10,551,851 | B2 | 2/2020 | Yu | |
| 11,173,970 | B2 * | 11/2021 | Otterstrom | B60L 1/20 |
| 11,338,866 | B2 * | 5/2022 | Haban | B62D 33/08 |
| 11,420,695 | B2 | 8/2022 | Viele et al. | |
| 11,613,312 | B2 * | 3/2023 | Milton | B60N 3/008<br>180/65.6 |
| 12,077,235 | B2 * | 9/2024 | Niedert | B62D 7/144 |
| 12,128,961 | B2 * | 10/2024 | Haban | B62D 33/08 |
| 12,377,919 | B1 * | 8/2025 | Florence | B62D 35/02 |
| 12,403,963 | B2 * | 9/2025 | Karve | B62D 35/00 |
| 2018/0111648 | A1 * | 4/2018 | Amar | B62D 35/001 |
| 2018/0111650 | A1 * | 4/2018 | Swantick | B62D 35/005 |
| 2019/0009839 | A1 * | 1/2019 | Tenstam | B62D 35/001 |
| 2019/0367102 | A1 * | 12/2019 | Haban | B62D 33/08 |
| 2023/0211833 | A1 * | 7/2023 | Jarlengrip | B62D 37/02<br>296/180.2 |
| 2024/0101132 | A1 * | 3/2024 | Šoštaric | B60W 50/0098 |
| 2025/0346107 | A1 * | 11/2025 | Sweere | H01M 8/04208 |

FOREIGN PATENT DOCUMENTS

| | | | | |
|---|---|---|---|---|
| DE | 102013008593 | A1 * | 12/2014 | B62D 21/14 |
| WO | WO-2016120597 | A1 * | 8/2016 | B62D 35/001 |

OTHER PUBLICATIONS https://www.gearbrain.com/autonomous-truck-startup-companies-2587305809.html, 16 pages, Jul. 7, 2020.

* cited by examiner

AUTONOMOUS VEHICLE WITH AN IMPROVED CAB DESIGN

TECHNICAL FIELD

The field of the disclosure relates generally to an autonomous vehicle and more specifically, to an autonomous vehicle having an improved cab design.

BACKGROUND OF THE INVENTION

In a non-autonomous vehicle or a semi-autonomous vehicle, such as a non-autonomous truck or a semi-autonomous truck, the truck cabin is designed to accommodate a driver and passengers, equipment for controlling the vehicle, such as a steering wheel, gas and brake pedals, a dashboard, a rearview mirror, and a sound system for example, and/or a bed or other fixtures to enable the driver to sleep or relax when the vehicle is not being operated.

In an autonomous vehicle a driver is not required. As a result, it is not necessary to include space in the cab for equipment, fixtures, and systems necessary for the driver to operate the vehicle, or rest when the vehicle is not being operated. Accordingly, most of the cabin space that is sized to house equipment, fixtures and systems will not be used to control the autonomous vehicle. Reducing the size or weight of the cabin would result in greater vehicle efficiency during operation. Additional improvements to efficiency can be made by reshaping the cab to be more aerodynamic without having to account for the needs of human occupants.

Accordingly, there is a need to reduce and optimize the size and shape of the vehicle cabin consistent with the reduced number of systems, equipment and fixtures necessary to operate an autonomous vehicle. Reducing the size of the cab will yield a reduction in autonomous vehicle operating costs.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, an autonomous vehicle is disclosed. The autonomous vehicle includes a plurality of wheels for supporting the autonomous vehicle, a cabin, and an engine. The cabin is supported by a vehicle frame. The plurality of wheels is connected to the vehicle frame. The cabin has a cabin bottom, a cabin top, and a front portion. The front portion extends between the cabin top and the cabin bottom, and the front portion includes an airfoil. The airfoil has a substantially rigid front surface and an aerodynamic shape.

In another aspect, a method is disclosed. The method includes modifying a cabin of an autonomous vehicle by removing at least a windshield, a steering wheel, and a seat for a driver from the cabin to reduce cabin volume by at least a predetermined percentage and designing the cabin to have a front portion including an airfoil and extending between a cabin top and a cabin bottom. The airfoil has a substantially rigid front surface and an aerodynamic shape. The cabin is supported by a vehicle frame connected with a plurality of wheels.

In yet another aspect, an autonomous vehicle is disclosed. The autonomous vehicle includes a plurality of wheels connected to a vehicle frame of the autonomous vehicle for driving the autonomous vehicle, a cabin, and an engine. The cabin has a cabin bottom, a cabin top and an airfoil extending between the cabin top and the cabin bottom. The airfoil has a substantially rigid front surface and a curved shape. The cabin is supported by the vehicle frame.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
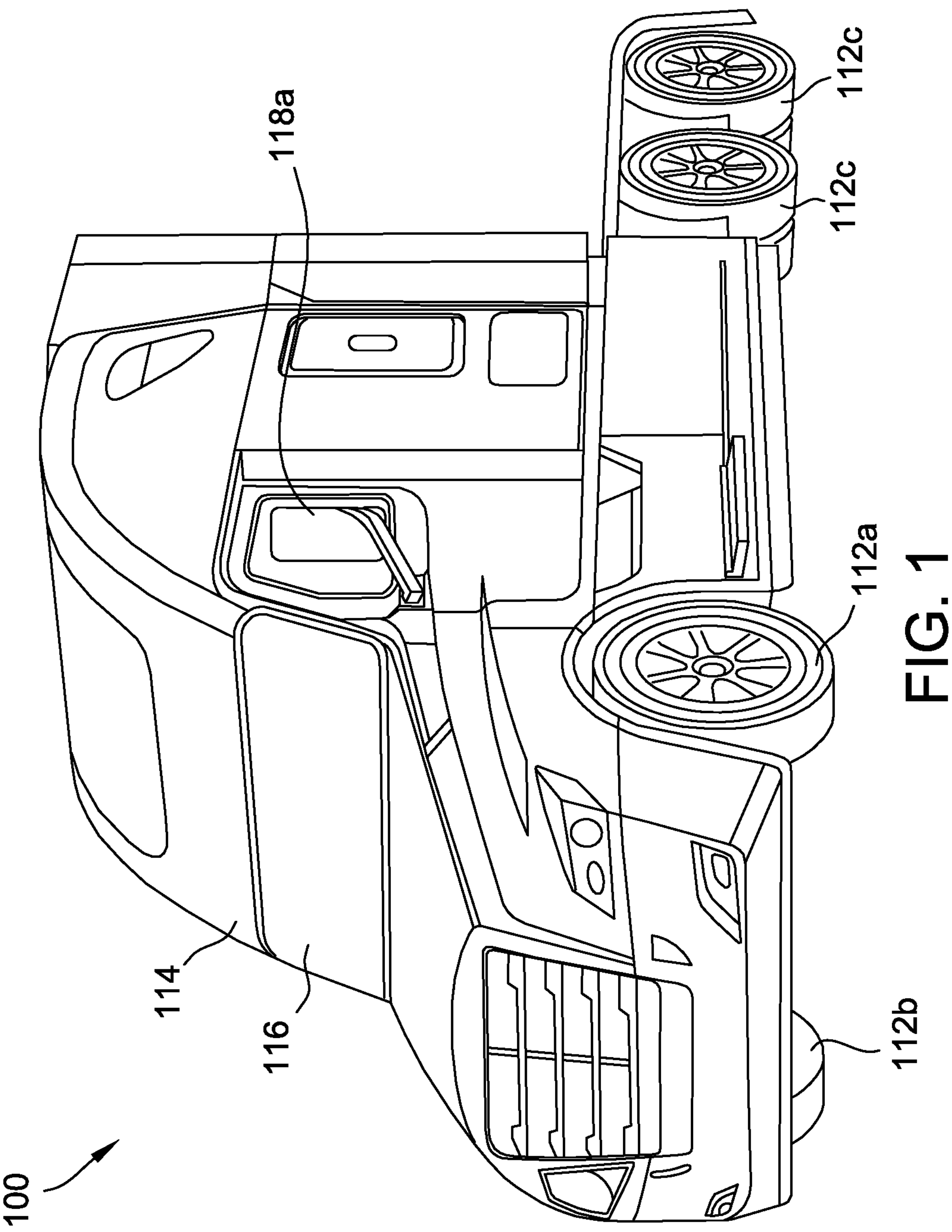
FIG. 1 is a schematic view of a vehicle such as a truck that includes various systems, fixtures and equipment included in a cabin of a non-autonomous vehicle or a semi-autonomous vehicle.

Corresponding reference characters indicate corresponding parts throughout the several views of the drawings. Although specific features of various examples may be shown in some drawings and not in others, this is for convenience only. Any feature of any drawing may be reference or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The Following terms are used in the present disclosure as defined below.

An autonomous vehicle: An autonomous vehicle is a vehicle that is able to operate itself to perform various operations such as controlling or regulating acceleration, braking, steering wheel positioning, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform a number of driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

As described in the present disclosure, a semi-autonomous vehicle, or a non-autonomous vehicle, such as a semi-autonomous truck or a non-autonomous truck, needs a human driver to operate the vehicle. A cabin of the truck therefore includes various fixtures, systems, and equipment, such as, but not limited to, a seat for the human driver, a seat for a co-driver or a passenger, a steering wheel, pedals, a dashboard, instrument readouts and controls, a sound system, a rearview mirror, a climate control interface and/or a climate control system. The cabin may also include a section for enabling the driver to sleep or rest when the vehicle is not being operated.

However, an autonomous truck does not require a human driver to operate the vehicle. Accordingly, various fixtures, systems and equipment described herein for use by the human driver may be eliminated. With the removal of the fixtures, systems and equipment from the vehicle cabin and associated cabin space, the cabin and the associated the cabin space may be redesigned or repurposed to improve the performance of the autonomous vehicle. By way of an example, the modified cabin may improve aerodynamic properties of the autonomous vehicle. Improvement in the aerodynamic properties may improve operating cost of the vehicle. In another example, removing equipment from the cabin may reduce the weight of the vehicle, thereby reducing the power required to operate the vehicle.

The autonomous vehicle (or the autonomous truck) referenced in the present disclosure may be a tractor trailer including a cabin that is repurposed as described herein to which a trailer may be connected. Various embodiments described herein may therefore correspond with modifications to the cabin or autonomous tractor or the tractor trailer.

In some embodiments, and by way of a non-limiting example, a windshield may be removed. Additionally, side view mirrors may also be removed. Alternatively, the side view mirrors may be designed as fully retractable into a body of the cabin or a body of the truck. By way of a non-limiting example, the side view mirrors may be designed to fully retract in the body of the cabin or the body of the truck to create a smooth outer surface of the body of the cabin or the body of the truck.

Since the fixtures, systems and equipment from the cabin are removed, the cabin space or cabin volume is substantially reduced, for example, by about at least 50 percent in comparison with the cabin space or cabin volume of a non-autonomous truck or a semi-autonomous truck. Accordingly, in some embodiments, since the cabin space or cabin volume is substantially reduced, structural members may be added in the reduced cabin space to withstand air pressure when the truck is driving, for example, on a road, at a high speed and/or in a windy environment. Alternatively, or additionally, a fuel tank and/or an engine housing may provide cabin support and an airfoil may be added to withstand air pressure when the truck is driving, for example, on a road, at a high speed and/or in a windy environment.

By way of a non-limiting example, in some embodiments, the airfoil may be moved or extended downward, for example, in the space that is previously occupied by the windshield and an engine housing. The airfoil that is moved or extended further downward may improve aerodynamic properties of the autonomous truck and may reduce operating costs of the autonomous truck having an improved cab design, as described herein.

In some embodiments, an engine may be moved rearward, for example, in the reduced cabin space. Additionally, or alternatively, front wheels may also be moved rearward, and, thereby, shortening a chassis of the tractor and improving rigidity. In some embodiments, an air-pad suspension holding a suspended portion of the cabin may also be removed.

In some embodiments, a fuel tank may also be redesigned, such that, the fuel tank may be reoriented to comprise a vertical fuel tank. Additionally, or alternatively, the fuel tank may be positioned above the rearward moved engine to provide additional structural support to an airfoil. In some embodiments, the airfoil may be moved or extended downward since the space that is previously occupied by the windshield and an engine housing is not repurposed for other things.

Accordingly, the airfoil (in the front of the truck) may be rounded for substantial aerodynamic improvement. The rounded airfoil may be designed such that a storage space, for example, to store necessary things like emergency supplies, electrical equipment, or stowable human interfaces, may be available. Additionally, or alternatively, the airfoil may be designed as a single continuous unit of fiberglass, and, therefore, eliminating most of the metal, glass, and/or epoxies required to build the cabin.

In some embodiments, and by way of a non-limiting example, the airfoil may be a fixed airfoil such that the airfoil may not be separated from the cabin or tractor, or the airfoil may be a detachable airfoil. The detachable airfoil may be attached to a chassis of the cabin or tractor either at a bottom portion of the airfoil or at a back side of the airfoil connected with a trailer as shown and discussed below using FIG. 2E and FIG. 2F, respectively.

In some embodiments, a sensor compartment of one or more sensors may be placed in the redesigned or repurposed cabin and may be moved rearward in the redesigned or repurposed cabin as described herein. However, the sensor compartment in the redesigned or repurposed cabin may be positioned at the same height above the road surface similar to a cabin in which all the described equipment, systems, and fixtures in the cabin are present. By way of a non-limiting example, the sensor compartment may be accessible from a door in the back of the cabin, from a front part that is opened by swinging forward or backward like a hood in the existing trucks, and/or a rack configured to cause the sensor compartment to slide out.

In some embodiments, the back of the cabin may not be redesigned, and accordingly allow trailers with currently known form-factors to be connected with the tractor having repurposed cabin as described herein. Additionally, or alternatively, rear vertical airfoils may be deployed along a back of the cabin. In some embodiments, the back of the cabin may provide an air-hose and an electrical interface.

While redesigning or repurposing of the cabin or tractor of the autonomous vehicle or the autonomous truck is described above at a high-level, the embodiments described above are discussed in more detail below with respect to FIGS. 1-3.

FIG. 1 illustrates a vehicle 100 which may include a truck that may further be conventionally connected to a single or tandem trailer to transport the trailers (not shown) to a desired location. The vehicle 100 includes a cabin 114 that can be supported by, and steered in, the required direction by front wheels 112*a*, 112*b*, and rear wheels 112*c* that are partially shown in FIG. 1. Wheels 112*a*, 112*b* are positioned by a steering system that includes a steering wheel and a steering column (not shown in FIG. 1). The steering wheel and the steering column may be located in the interior of cabin 114.

The vehicle 100 may be a non-autonomous vehicle or a semi-autonomous vehicle. The vehicle 100 may be a currently known autonomous vehicle in which the cabin 114 is not redesigned or repurposed as described herein. In other words, various fixtures, systems, and equipment described herein and typically included in the cabin 114 of the vehicle 100 are not removed.

In some embodiments, the cab of the vehicle 100 that is an autonomous vehicle may be redesigned or repurposed and various systems, fixtures and equipment including, but not limited to, a seat for the human driver, a seat for a co-driver or a passenger, a steering wheel, a steering column, pedals, a dashboard, a sound system, a rearview mirror, a climate control interface, a climate control system, and/or an instrument user interface may be removed from the cabin 114. Additionally, or alternatively, a section in the cabin 114 including a bed for the driver to sleep or rest when the vehicle 100 is not being operated may also be removed.

In some embodiments, and by way of a non-limiting example, a windshield 116 may be removed. Additionally, side view mirrors such as a side view mirror 118*a* on the left side and a side view mirror on the right side of the cabin 114 may also be removed. Alternatively, the side view mirrors may be designed as fully retractable into a body of the cabin 114 or a body of the vehicle 100. By way of a non-limiting example, the side view mirrors may be designed to fully retract in the body of the cabin or the body of the vehicle 100 to create a smooth outer surface of the body of the cabin or the body of the vehicle 100.

Figure 2A:
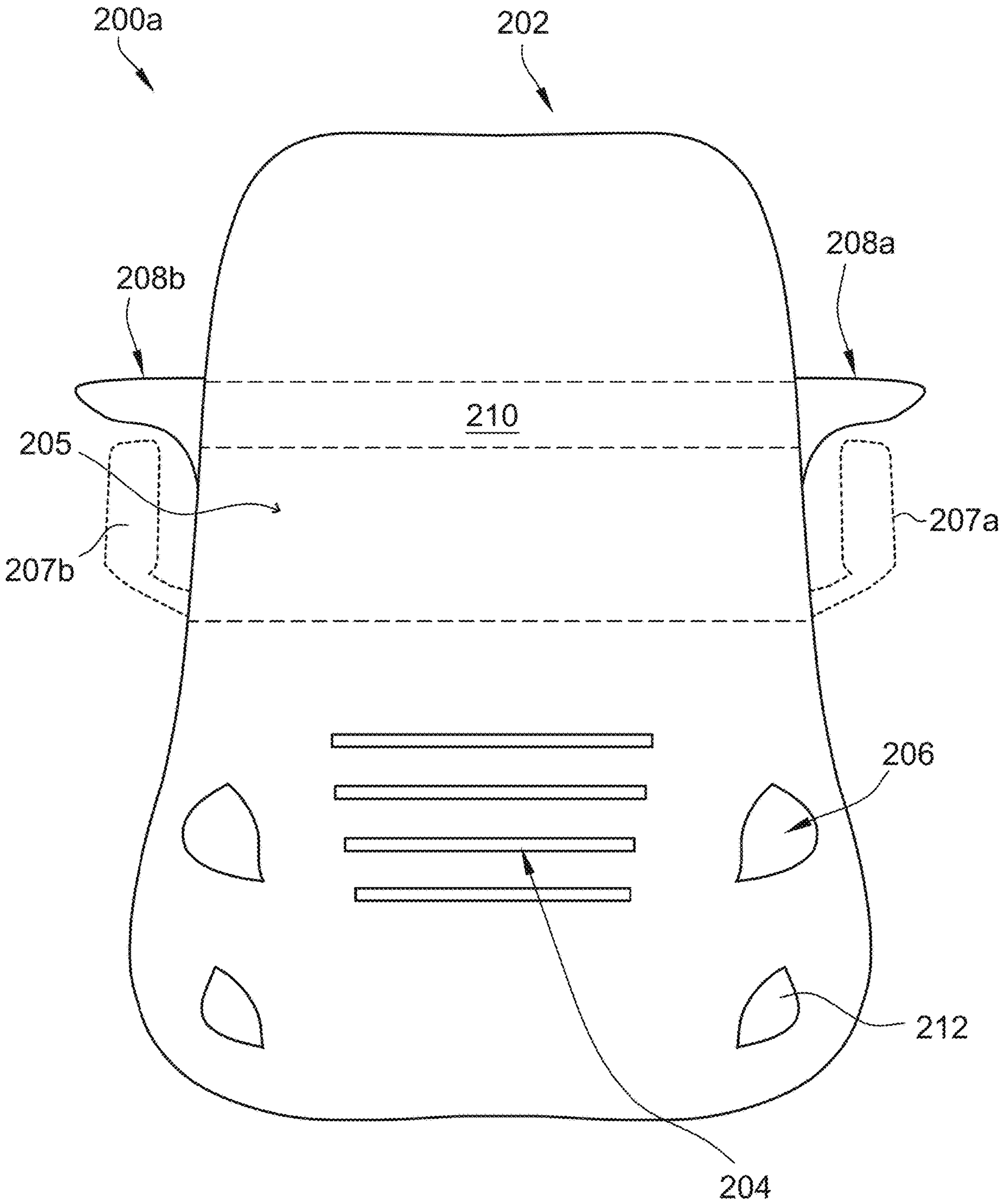
FIGS. 2A-2F are various views of an exemplary tractor or cabin of an autonomous vehicle according to embodiments of the present disclosure.

FIG. 2A illustrates a front view 200*a* of an exemplary tractor or cabin redesigned or repurposed according to embodiments described herein. As shown in the front view 200*a*, the windshield shown as 205 (that is shown in FIG. 1 as 116) and side view mirrors 207*a* and 207*b* (that are shown in FIGS. 1 as 118*a* and 118*b*) are removed from the cabin and are depicted with dashed lines in FIG. 2A to indicate their removal. The cabin 114 may be redesigned or repurposed using an airfoil 202. The airfoil 202 may be designed to improve aerodynamic properties, for example, by extending or relocating the airfoil 202 into the space of the removed windshield 205. The airfoil 202 may be made of fiberglass material and may be a single and continuous piece or, alternatively, the airfoil may be comprised of a number of discrete members that are made integral using known connection methods and fasteners. The airfoil 202 may have air intakes 204 modified based upon the airfoil 202.

In some embodiments, as shown in FIG. 2A, headlights 206 and/or sidelights 212 may be designed to have smooth surface and may be moved rearward. By way of an example, the headlights 206 and/or sidelights 212 may be designed to follow the teardrop shape of the surrounding airfoil. External sensor pods may be encased in wings 208*a* and 208*b*, which may be streamlined and retained for rearward and stereo observability. In some embodiments, a sensor compartment 210 may be positioned in a reduced cabin space area at a height above a road surface. Additionally, or alternatively, sensors may be positioned on the wings 208 and 208*b*. In some embodiments, wings 208 and 208*b* may be eliminated and replaced by a wider airfoil, for example, for wide-load configurations of the tractor or cabin.

Figure 2B:
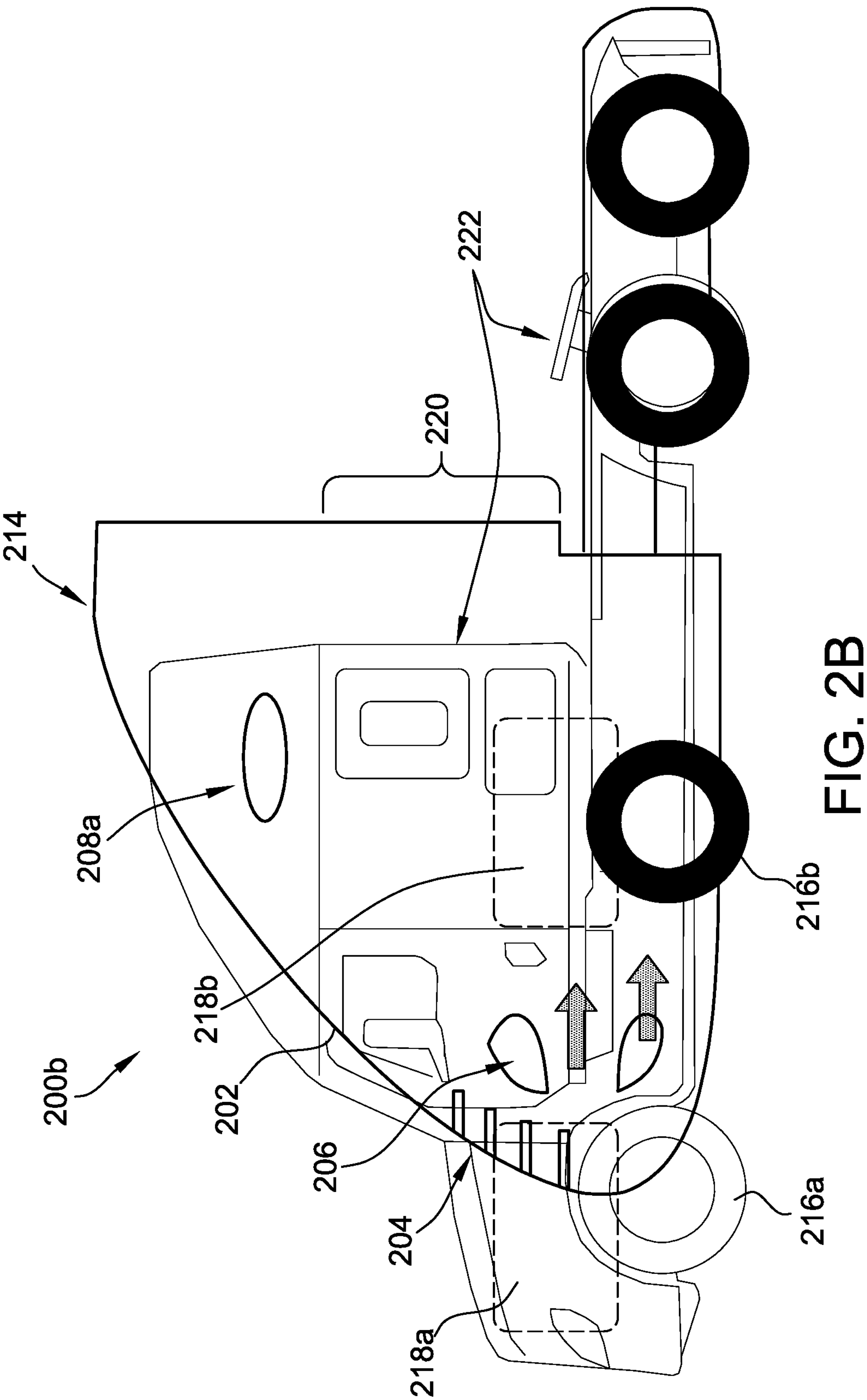

FIG. 2B illustrates a side view 200*b* of an exemplary tractor or cabin redesigned or repurposed according to embodiments described herein. As shown, an engine may be moved rearward towards wheels from its original position 218*a* to new position 218*b*, and the front wheels may be moved rearward from their original position 216*a* to their new position 216*b*. In other words, the engine may be positioned in the middle portion or a rear portion of the cabin. The airfoil 202 may also include a mount surface 214 for mounting a global navigation satellite system (GNSS) along the airfoil 202. In FIG. 2B, active (or passive) side-extenders 220 may be present on the redesigned or repurposed cabin. By way of a non-limiting example, trailer hookups 222 including a 5th wheel hitch, air-brake hoses, and/or an electrical interface such as a 7-pin connector, may be retained on the repurposed cabin or proximate to the repurposed cabin.

Figure 2C:
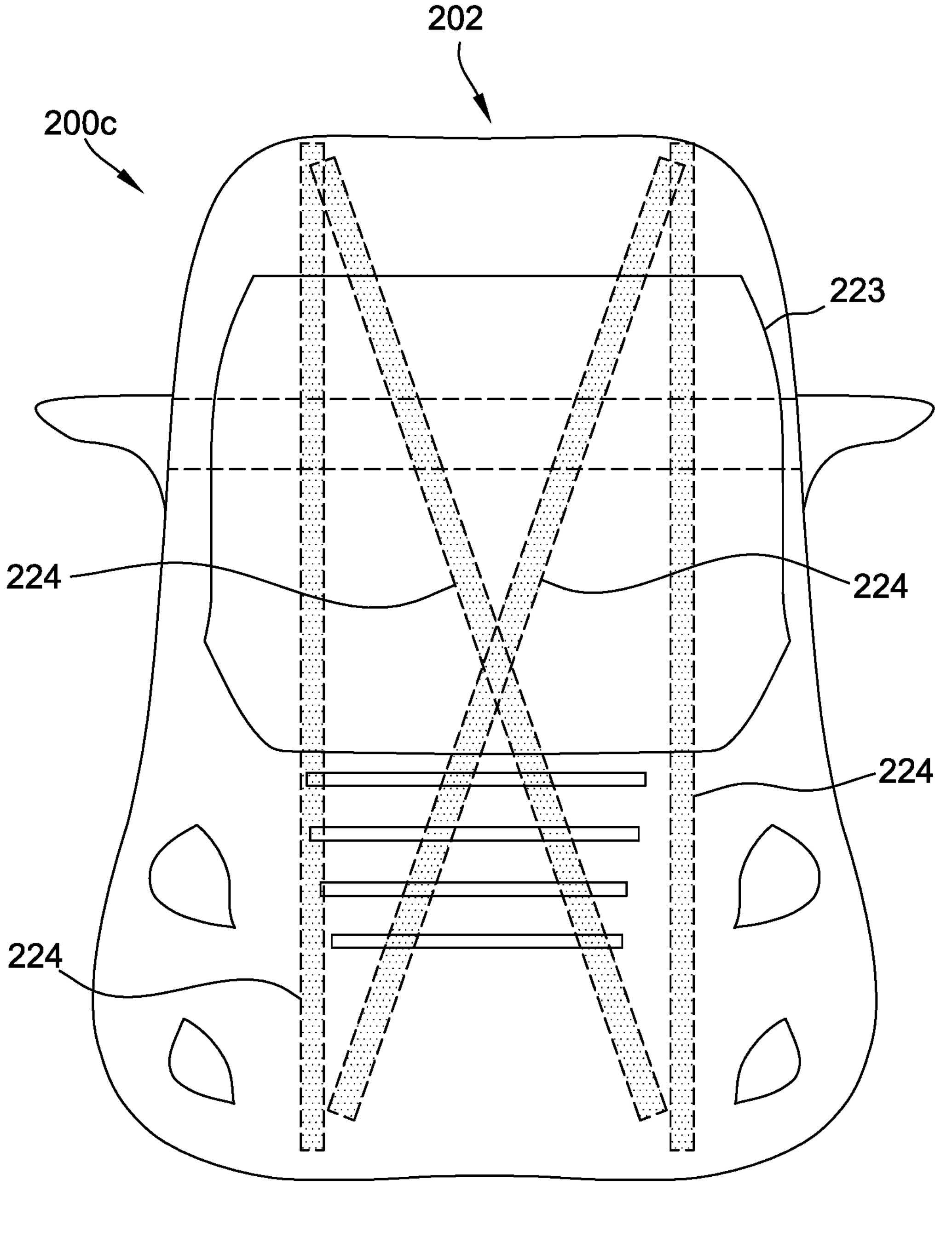

FIG. 2C illustrates another front view 200*c* of an exemplary tractor or cabin redesigned or repurposed according to embodiments described herein. Since the fixtures, systems, and equipment from the cabin 114 are removed, the cabin space or cabin volume is substantially reduced. Accordingly, in some embodiments, structural members 224 may be added in the reduced cabin space to withstand air pressure when the truck is driving, for example, on a road, at a high speed and/or in a windy environment. Alternatively, a fuel tank and/or an engine housing may be reoriented to comprise a vertical fuel tank to provide support to the airfoil 202 to withstand air pressure when the truck is driving, for example, on a road, at a high speed and/or in a windy environment. Additionally, or alternatively, a door 223 in the front of the cabin may provide access to the components in the interior of the redesigned cabin for maintenance, parts replacement, and access to the storage space.

Figure 2D:
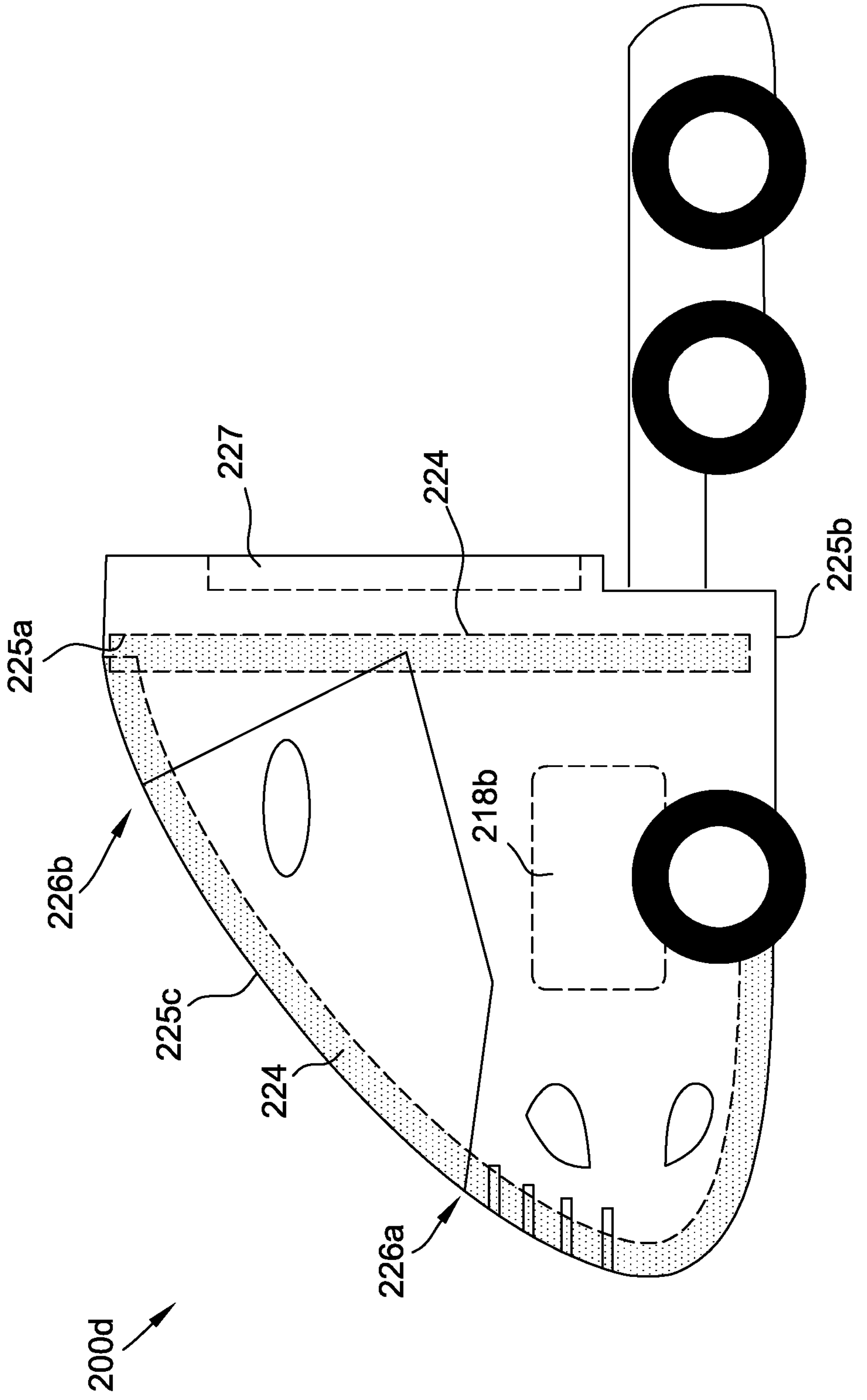

FIG. 2D illustrates another side view 200*d* of an exemplary tractor or cabin redesigned or repurposed according to embodiments described herein. In FIG. 2D, the structural members 224 added in the reduced cabin space to withstand air pressure, a first pivot option 226*a*, and a second pivot option 226*b* are shown. The first pivot option 226*a* and the second pivot option 226*b* may be adapted or designed to open by swinging forward and backward, respectively, similar to how a hood in existing truck such as a truck shown in FIG. 1. A door 227 provided on the back of the repurposed cabin may provide access to internals of the tractor or cabin redesigned or repurposed according to embodiments described herein. Alternatively, the first pivot option 226*a* and the second pivot option 226*b* may be adapted or designed to open by swinging backward and forward, respectively. Additionally, or alternatively, the engine or the fuel tank each may have a separate door to access the engine or the fuel tank.

In the side view 200*d*, a cabin top 225*a* and a cabin bottom 225*b* are shown. A front portion of the cabin 225*c* is shown as extending between the cabin top 225*a* and the cabin bottom 225*b*. The front portion of the cabin 225*c* may include an airfoil having a substantially opaque or rigid front surface. In other words, the cabin may have an airfoil extending between the cabin top 225*a* and the cabin bottom 225*b*. As shown in the side view 200*d*, the front portion 225*c* (or the airfoil) may have an aerodynamic shape, such as a curved shape or a rounded shape.

Figure 2E:
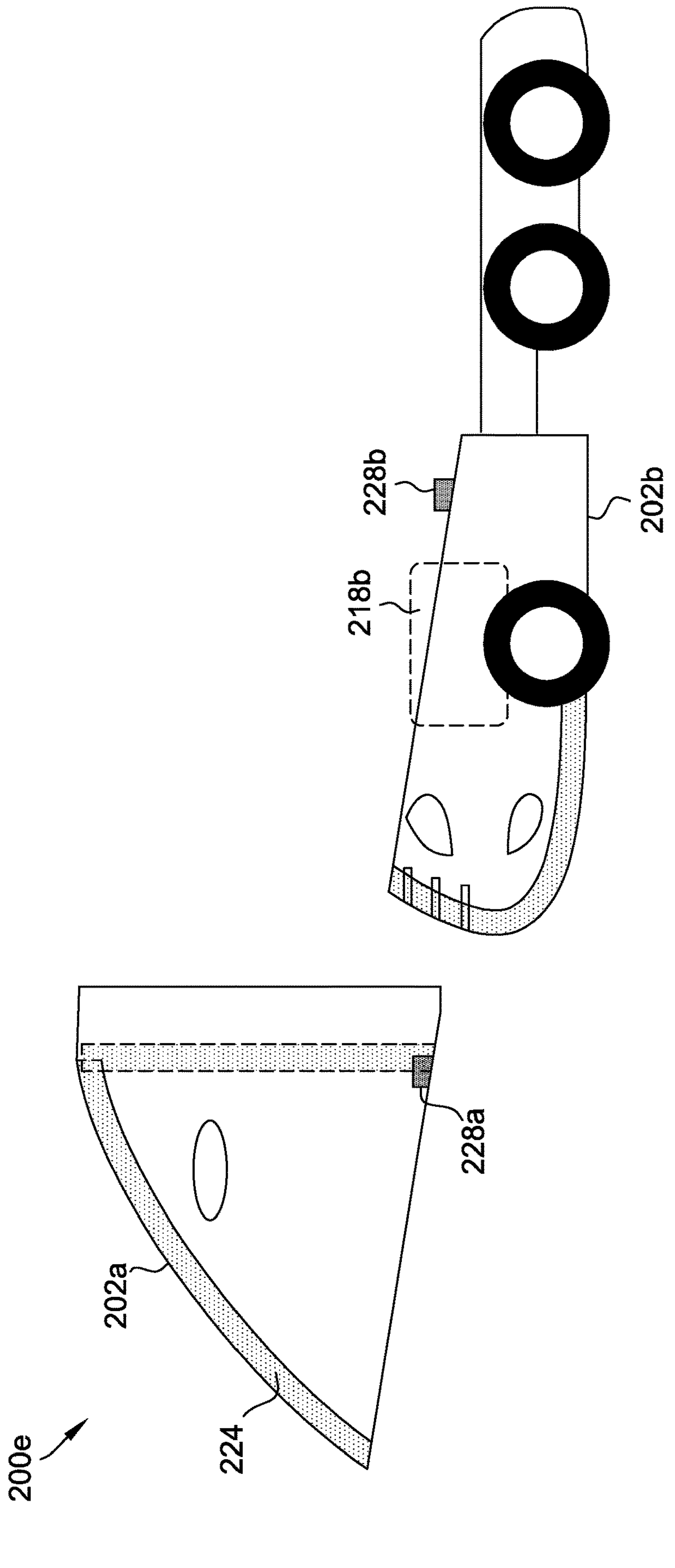

FIG. 2E illustrates another side view 200*e* of an exemplary tractor or cabin redesigned or repurposed according to embodiments described herein. The repurposed cabin airfoil 202 of FIG. 2A-2D may be detachable and may be divided in to two parts-a first airfoil part 202*a* and a second airfoil part 202*b* as shown in FIG. 2E. The first airfoil part 202*a* may be vertically attached with the second airfoil part 202*b* using electrical interfaces 228*a* and 228*b*. The second airfoil part 202*b* may be attached to the chassis and the first airfoil part 202*a* may be swapped in or out to attach or detach, respectively. As shown in FIG. 2E. the signaling lights 206 and/or 212 and the air intake 204 may be part of the second airfoil part 202*b*. In some embodiments, the signaling lights 206 and/or 212 and the air intake 204 may be part of the first airfoil part 202*a*.

Figure 2F:
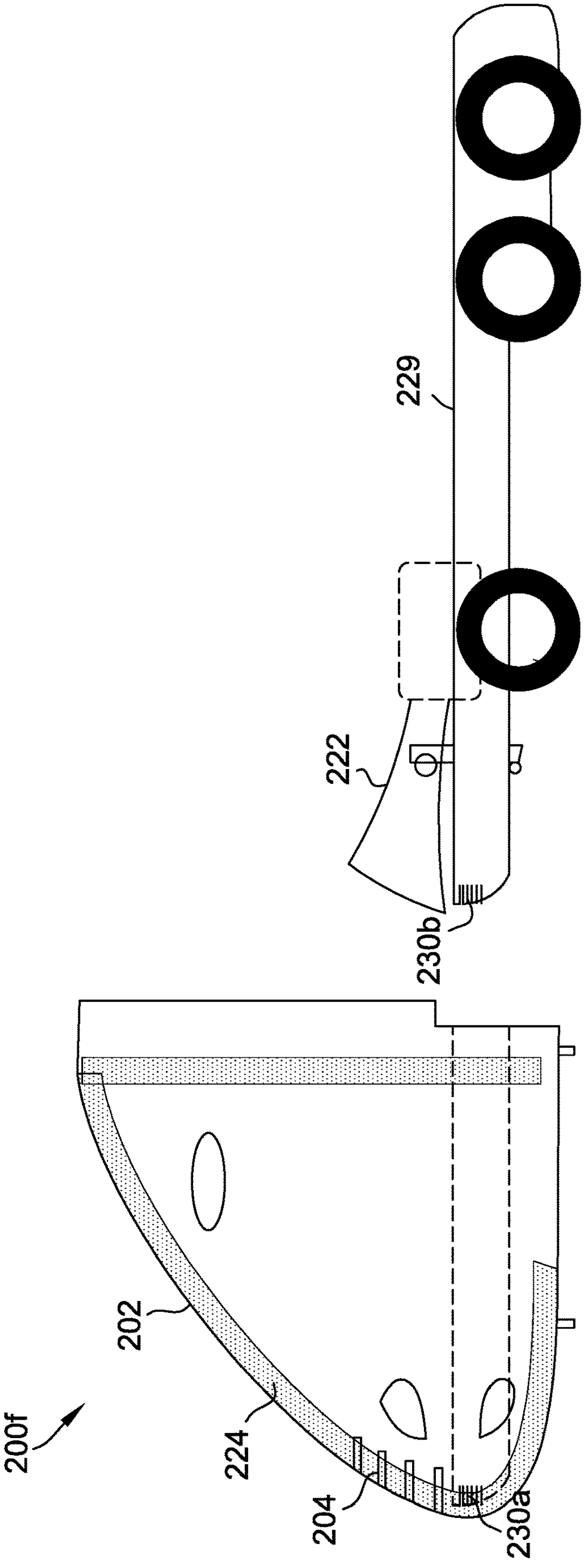

FIG. 2F illustrates another side view 200*f* of an exemplary tractor or cabin redesigned or repurposed according to embodiments described herein. The repurposed cabin airfoil 202 may be horizontally attached with the trailer using a chassis guide 229 and a hitch 222 shown in FIG. 2F. An electrical interface 230*a* on the repurposed cabin may be attached with an electrical interface 230*b* on the trailer. As shown in FIG. 2F, the signaling lights 206 and/or 212 may be mounted on the chassis.

Detachable airfoils shown in FIG. 2E and FIG. 2F enable some or all of the sensors used for autonomy to be located in the airfoil. That means that in addition to being able to swap airfoils for the sake of different loads, airfoils may be swapped to upgrade or adjust the sensor package for different needs, without altering the shape. This is dependent on having a connector robust enough to support multiple sensors in terms of power and data with a reasonable approximation of real-time. Pivot options described herein also provide access to upgrade or adjust the sensor package for different needs. In some embodiments, upgrading the sensor package may also require modification to the processing software on the vehicle. In some embodiments, the airfoil may have different shapes and characteristics for different load types. By way of a non-limiting example, a lower airfoil may be used for a flatbed, and wider airfoil may be used for a wide load, etc.

The tractor shown in FIG. 2A-FIG. 2F and repurposed to reduce cabin volume by removing systems, equipment, and fixtures, as described herein, may be attached with a trailer. The tractor shown in FIG. 2A-FIG. 2F thus describes an autonomous tractor to which the trailer may be attached. The autonomous tractor with the trailer attached to it may drive, for example, on a road, similar to any other non-autonomous truck with a trailer attached to it. However, the tractor shown in FIG. 2A-FIG. 2F may provide benefits of improved aerodynamic properties and reduced operating cost for the autonomous truck. In addition, the cabin may be designed as an airfoil having a rounded nose shape and particular nose length that would reduce aerodynamic drag force on the tractor-trailer. By improving the aerodynamic properties of the tractor, operating costs may be improved due to reduced fuel cost.

Figure 3:
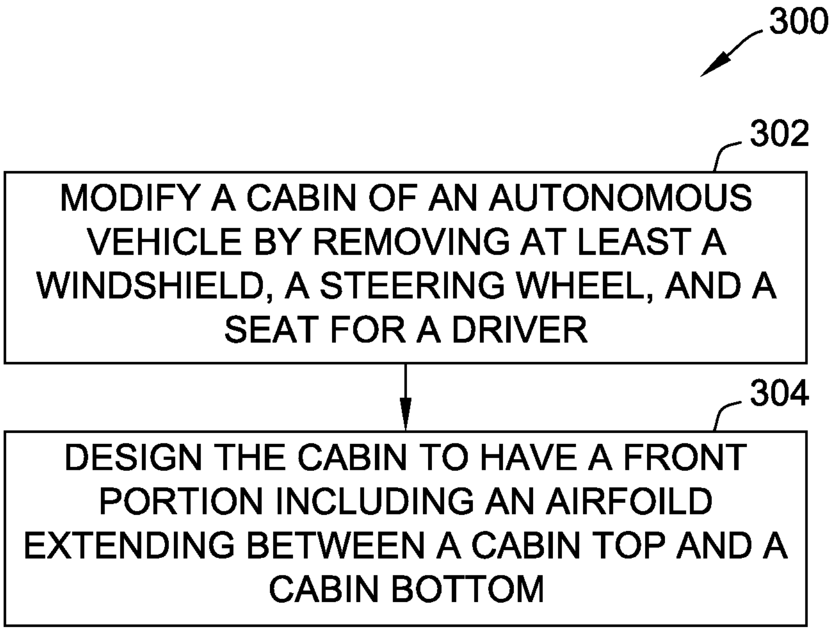
FIG. 3 is an exemplary flow chart of a method of designing a tractor or cabin of an autonomous vehicle as shown in FIGS. 2A-2F according to embodiments of the present disclosure.

FIG. 3 is an exemplary flow chart 300 of a method that includes modifying 302 a cabin of an autonomous vehicle by removing at least a windshield, a steering wheel, and a seat for a driver from the cabin to reduce cabin volume by at least predetermined percent. The predetermined percentage by which the cabin volume may be reduced may be at least 50 percent of known vehicles such as the vehicle shown in FIG. 1. Additionally, the cabin may be modified to remove a steering column, one or more pedals (for example, an accelerator pedal, a brake pedal, or a clutch pedal), a rearview mirror, a seat for a co-driver, or a section for resting or sleeping by the driver or the co-driver. Additionally, or alternatively, an engine and/or front wheels of the autonomous vehicle may be moved rearward. In other words, the engine of the autonomous vehicle may be positioned within a middle portion or a rear portion of the cabin. The cabin may be supported by a vehicle frame and a plurality of wheels connected with the vehicle frame for supporting the autonomous vehicle along the road. The cabin may have a cabin bottom, a cabin top, and a front portion.

In some embodiments, and by way of a non-limiting example, side view mirrors attached to the cabin may be removed. Alternatively, side view mirrors attached to the cabin may be designed as retractable into a body of the cabin, and, thereby, forming a smooth outward surface of the cabin. Additionally, or alternatively, headlights or signaling lights on a chassis of the cabin may be designed as having a smooth surface, and an aerodynamic shape, such as a teardrop shape or a shape that is a segment of a teardrop.

In some embodiments, the method may include designing 304 the cabin to have the front portion extending between the cabin top and the cabin bottom. The front portion may include an airfoil that extends between the cabin top and the cabin bottom. The airfoil may have a substantially opaque or rigid front surface. The airfoil may have a rounded shape or a curved shape. The rounded shape or the curved shape of the airfoil may improve aerodynamic properties of the autonomous vehicle. The airfoil extending between the cabin bottom and the cabin top may be in a space created by removal of the windshield or the engine. In some examples, the airfoil may be divided into a first part and a second part that are attached vertically. In some examples, the airfoil may be horizontally attached with a chassis of the cabin, the cabin bottom, or the vehicle frame.

The modified cab design according to embodiments described herein may thus improve aerodynamic properties of the autonomous vehicle and may also improve operational costs of the autonomous vehicle.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processors, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms such as processor, processing device, and related terms.

In the embodiments described herein, memory may include, but is not limited to, a non-transitory computer-readable medium, such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An autonomous vehicle comprising:

a plurality of wheels for supporting the autonomous vehicle; and a cabin, supported by a vehicle frame, the plurality of wheels being connected to the vehicle frame, the cabin having a cabin bottom, a cabin top and a front portion extending between the cabin top and the cabin bottom, the front portion comprising an airfoil, wherein the airfoil has a substantially rigid front surface and an aerodynamic shape and extends between the cabin top and the cabin bottom, wherein the cabin does not include a windshield, a steering wheel, or a seat for a driver, thereby enabling a reduction of cabin volume by at least a predetermined percentage.

2. The autonomous vehicle of claim 1, wherein the cabin is further modified to:

remove a steering column, one or more pedals, a rearview mirror, a seat for a co-driver, a climate control system, an instrument user interface, or a section for resting or sleeping by the driver or the co-driver; and position an engine of the autonomous vehicle within a middle portion or a rear portion of the cabin.

3. The autonomous vehicle of claim 1, wherein side view mirrors attached to the cabin of the autonomous vehicle are removed.

4. The autonomous vehicle of claim 1, further comprising side view mirrors attached to the cabin, wherein the side view mirrors are retractable into a body of the cabin forming a smooth outward surface of the cabin.

5. The autonomous vehicle of claim 1, further comprising structural members added within a cabin space area, the structural members provide support to withstand air pressure while driving at a high speed or in a windy environment.

6. The autonomous vehicle of claim 1, further comprising headlights or signaling lights on a chassis of the cabin.

7. The autonomous vehicle of claim 1, further comprising a headlight or a signaling light on a chassis of the cabin, the headlight or the signaling light is designed as having a smooth surface and an aerodynamic shape.

8. The autonomous vehicle of claim 1, wherein the cabin includes a compartment of one or more sensors, wherein the compartment is located in the cabin at a height above a road surface.

9. The autonomous vehicle of claim 8, wherein the compartment is accessed through a door or by sliding the compartment through a sliding rack.

10. The autonomous vehicle of claim 1, wherein the airfoil is divided into a first part and a second part, the first part and the second part are attached vertically.

11. The autonomous vehicle of claim 1, wherein the airfoil is horizontally attached with the cabin bottom or the vehicle frame.

12. A method, comprising:

modifying a cabin of an autonomous vehicle by removing at least a windshield, a steering wheel, and a seat for a driver from the cabin to reduce cabin volume by at least a predetermined percentage; and designing the cabin to have a front portion comprising an airfoil and extending between a cabin top and a cabin bottom, wherein the airfoil has a substantially rigid front surface and an aerodynamic shape, and wherein the cabin is supported by a vehicle frame connected with a plurality of wheels.

13. The method of claim 12 further comprising modifying the cabin by removing a steering column, one or more pedals, a rearview mirror, side view mirrors, a seat for a co-driver, or a section for resting or sleeping by the driver or the co-driver.

14. The method of claim 12 further comprising positioning an engine of the autonomous vehicle within a middle portion or a rear portion of the cabin.

15. The method of claim 12 further comprising adding structural members within a cabin space area to withstand air pressure while driving at a high speed or in a windy environment.

16. The method of claim 12, wherein the airfoil is divided into a first part and a second part, and the method further comprising vertically attaching the first part of the airfoil with the second part of the airfoil.

17. The method of claim 12, wherein the airfoil is detachable, and the method further comprising horizontally attaching the airfoil with the cabin bottom or the vehicle frame.

18. The method of claim 12 further comprising constructing side view mirrors attached to the cabin as retractable into a body of the cabin to form a smooth outward surface of the cabin.

19. An autonomous vehicle comprising:

a cabin having a cabin bottom, a cabin top and an airfoil extending between the cabin top and the cabin bottom, the airfoil having a substantially rigid front surface and a curved shape, the airfoil extending between the cabin top and the cabin bottom, the cabin supported by a vehicle frame, the vehicle frame connected to a plurality of wheels for driving the autonomous vehicle, wherein the cabin does not include a windshield, a steering wheel, or a seat for a driver, thereby enabling a reduction of cabin volume by at least a predetermined percentage.

20. The autonomous vehicle of claim 19, wherein the cabin is further modified to:

remove a steering column, one or more pedals, a rearview mirror, a seat for a co-driver, a climate control system, an instrument user interface, or a section for resting or sleeping by the driver or the co-driver; or position an engine of the autonomous vehicle within a middle portion or a rear portion of the cabin.

* * * * *